INVENTORS
ROBERT P. DE LEU, ROBERT E.
STRANG & THAYNE K. GARBERICK
BY

ATTORNEY

July 7, 1970  R. P. DE LEU ETAL  3,518,962
OIL GAUGE FOR PILLOW BLOCKS
Filed March 14, 1968

INVENTORS
ROBERT P. DE LEU, ROBERT E.
STRANG & THAYNE K. GARBERICK
BY
ATTORNEY

United States Patent Office 3,518,962
Patented July 7, 1970

3,518,962
OIL GAUGE FOR PILLOW BLOCKS
Robert P. De Leu, South Bend, Robert E. Strang, North Liberty, and Thayne K. Garberick, South Bend, Ind., assignors to Reliance Electric Company, a corporation of Delaware
Filed Mar. 14, 1968, Ser. No. 713,193
Int. Cl. G01f 23/02
U.S. Cl. 116—118                                    9 Claims

ABSTRACT OF THE DISCLOSURE

An oil level gauge for pillow blocks and the like in which a body of generally cylindrical shape and constructed of transparent material contains a cavity for receiving oil from the pillow block reservoir to indicate the level of oil therein. The outer end of the cylindrical portion contains a circle or other type of indicator to assist in determining the level of the oil in the pillow block.

---

A common type of pillow block used industrially, particularly in conjunction with large and heavy equipment in which the bearings are required to operate under heavy loads for prolonged periods of time, involves the use of babbitted or bronze liner bearings which are lubricated from an oil reservoir in the lower part of the pillow block housing by the use of oil rings on the shaft journalled in the bearing. Since the rings are constantly passing through the oil in the reservoir and carrying the oil onto the shaft adjacent the bearing, a substantially constant oil level must be maintained in the reservoir for satisfactory or optimum performance. The pillow blocks are frequently installed in confined locations and in difficult to reach places, and are often operated under conditions which cause dirt, dust and sludge to accumulate thereon. Since it is important to maintain the proper oil level in the pillow blocks, the gauges thereon must be inspected from time to time and the oil level adjusted, if required. The gauges used on these pillow blocks in the past have been difficult to read, particularly in poorly lighted places and from various positions, and have been difficult to clean thoroughly so that the gauges could easily be seen and read. It is therefore one of the principal objects of the invention to provide a gauge for pillow blocks and the like which is relatively simple in construction and operation and which can easily be read from various angular positions and at substantial distances therefrom.

Another object of the invention is to provide a gauge of the aforesaid type which can easily and efficiently be cleaned to permit easy reading thereof from different locations and under various lighting conditions, and which can effectively be used under various adverse operating conditions with no special attention being required to maintain it in optimum operating condition.

Still another object of the invention is to provide a gauge for pillow blocks which can be fabricated in one piece from relatively inexpensive materials and with the use of standard equipment, and which can easily be installed and maintained without the use of any special tools or equipment for long, trouble-free service.

Additional objects and advantages of the invention will become apparent from the following description and accompanying drawings, wherein.

Figure 1:
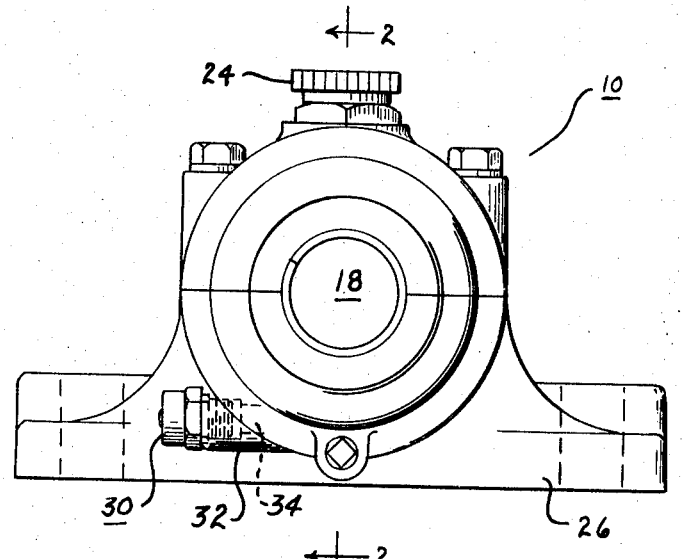
FIG. 1 is an end elevational view of a pillow block having the present oil gauge installed thereon.
Figure 2:
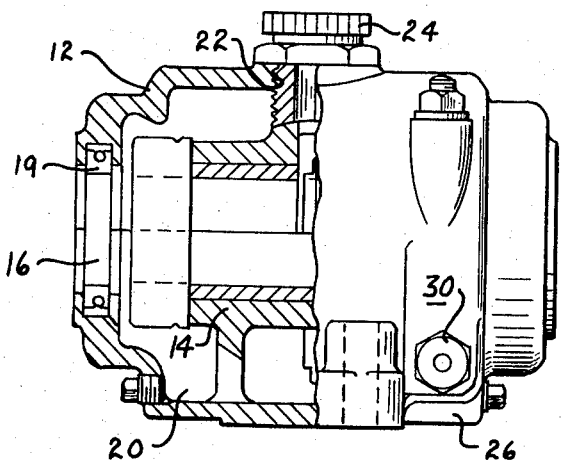
FIG. 2 is a partial cross sectional and elevational view of the bearing shown in FIG. 1, the section being taken on line 2—2 of the latter figure.

Referring more specifically to the drawings, and to FIGS. 1 and 2 wherein a pillow block is shown in order to illustrate the manner in which the present oil gauge is installed and used, numeral 10 designates the pillow block, 12 the housing thereof, and 14 a bearing for receiving a shaft which projects outwardly at opposite ends of the bearing through openings 16 and 18. Each of the two openings is sealed by a gasket 19 which engages the periphery of the shaft extending therethrough. The bearings 14 are of the babbitted or bronze liner type and are self-aligning within housing 12. The present pillow block utilizes an oil sump or well 20 for a suitable lubricant which is carried onto the shaft from the well by one or more oil rings mounted on the shaft and partially submerged in the oil in the sump. The oil is added to the housing through an opening 22 in the top thereof which is closed by a cap 24. The housing is mounted on a base 26 which may be secured by bolts, studs or other suitable securing means to a support base. The pillow block structure thus far is considered, for the purpose of the present description, as conventional and merely illustrative of one type of pillow block on which the present oil gauge may be used.

The present oil gauge 30 is mounted on a boss 32 on housing 12 and is connected to well 20 by a passage 34 extending inwardly through boss 32. The passage 34 is threaded at its entrance for receiving the threaded end 36 of the oil gauge. While the gauge is preferably mounted directly on the boss, it may be mounted outwardly therefrom by using a nipple, tube or other conduit for supporting the gauge in any position horizontally outward from the boss passage.

The gauge consists of a cylindrical body portion 40 having an axially positioned cavity 42 therein, open at its inner end 46 for direct communication with passage 34 in boss 32 and closed at its outer end by a disc-shaped wall 44. The external surface of body 40 contains a hexagonally shaped portion 48 for receiving a wrench or other tool for securing the gauge to boss 32 by the threads 36 on the gauge and the threads on the internal surface of boss 32. A basket 50 is mounted on body 40 between threaded portion 36 and hexagonal portion 40 and seats on the outer end of boss 32 to form an effective seal between the gauge and the boss.

Figure 3:
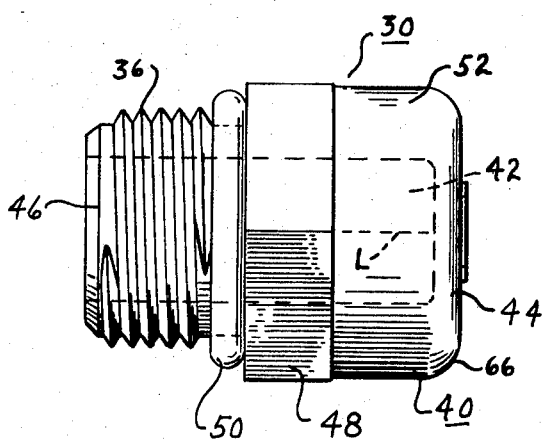
FIG. 3 is an enlarged side elevational view of the present oil gauge showing it removed from the pillow block.

The body 40 is constructed of transparent plastic, such as Lucite, or other suitable transparent material, so that the oil in passage 42 can be observed either from end 44 or directly from the side along portion 52 of body 40. The gauge as seen in FIG. 3 is preferably formed as a single piece, normally by a molding operation in which both the hexagonal portion and threads are formed simultaneously with portion 52. However, portion 52 may be formed separately of plastic or other transparent material, and thereafter secured to portions 36 and 48.

The end disc 44 contains an outwardly projecting annular boss 60, the outer surface 62 of which contains an opaque film or layer to render it readily visible. The annular boss 60 constitutes a level indicator to assist in determining the proper oil level in the gauge, and hence in well 20. The layer may be formed either by a paint or lacquer-like material, or may be a separate plastic or metal ring secured onto the surface of annular boss 60 or directly on the surface of disc-shaped end 44 if the boss is omitted.

Figure 4:
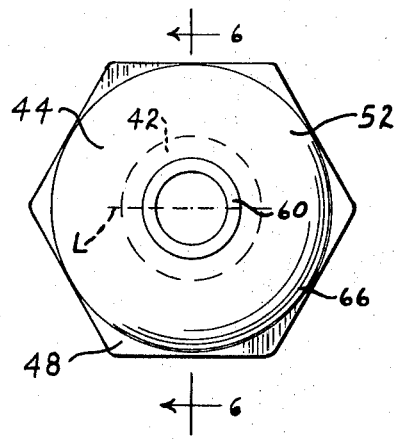
FIG. 4 is an elevational view of the outer end of the oil gauge shown in FIG. 3.
Figure 5:
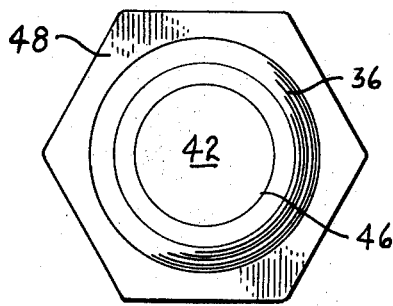
FIG. 5 is an elevational view of the inner end of the gauge shown in FIGS. 3 and 4.
Figure 6:
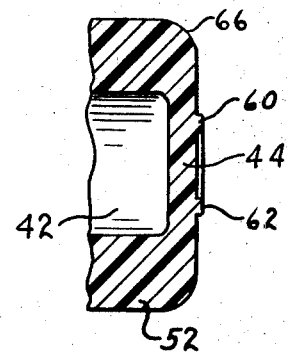
FIG. 6 is a fragmentary cross sectional view of the gauge shown in the preceding figures, the section being taken on line 6—6 of FIG. 4.

In the operation of the present oil gauge, the gauge is installed on the housing in the manner illustrated in FIGS. 1 and 2, and a lubricant is added to pillow block well 20 until the level of the lubricant in the well is approximately at the center of annular boss 60, as indicated by lubricant level line L in FIGS. 3 and 4. As the well is filled, the oil flows through passage 34 in boss 32 into cavity 42 of the gauge and in effect registers the oil level in the well, on the internal surface of body 40 in portion 52, thus clearly revealing the level of the lubricant in the well. During the operation of the pillow block, the amount of lubricant in well 20 can readily be checked by one servicing the bearing by merely observing the oil level through the transparent side walls of portion 52 or through end wall 44 relative to the indicator ring of annular boss 60. If the amount of lubricant in the well decreases so that the level in cavity 42 approaches the lower part of annular boss 60, additional lubricant would be added through opening 22 in housing 12.

While pillow blocks are often used in difficult to reach locations and in confined and poorly lighted places, the oil level of the present gauge can readily be observed since the level can be seen directly, either through the side wall of portion 52 or through end wall 44, and in view of the smooth unobstructed external surfaces of these two parts, any dirt, grease or other foreign matter can readily be wiped therefrom without any special cleaning operation or tools being required. The curved annular corner 66 facilitates cleaning and improves the visibility of the oil in cavity 42. Further, the one-piece construction of the present gauge permits a continuous, unobstructed cavity 42 substantially throughout the full length of the unit so that no flow turbulence is created therein. The gauge can readily be removed from the pillow block housing, thoroughly cleaned and reinstalled or easily replaced if it has been damaged or has become defective.

While only one embodiment of the present oil gauge has been described in detail herein, various changes and modifications may be made without departing from the scope of the invention.

We claim:

1. An oil level gauge for pillow blocks having a horizontally disposed oil passage, comprising a one-piece body with an outer cylindrical portion of transparent material and a generally flat disc-shaped member of transparent material joined integrally to said outer portion and closing the outer end thereof, said body having a cavity near the outer end and a passage which extends through the inner end of said body, an outwardly projecting means on said disc-shaped member indicating the desired oil level, threads on said body adjacent the inner end thereof for mounting said gauge on the pillow block at said oil passage with said body cavity and said oil passage in axial alignment with one another, and a means on said body for assisting in mounting said body on the pillow block.

2. An oil level gauge as defined in claim 1, in which said means on said disc-shaped member for indicating the desired oil level consists of an annular member in axial alignment with said cavity.

3. An oil level gauge as defined in claim 2, in which said annular member consists of an annular boss protruding outwardly from said disc-shaped member and a layer of opaque material on said annular boss.

4. An oil level gauge as defined in claim 1, in which said body is of a one-piece construction of plastic material and contains threads adjacent the inner end for mounting said gauge on the pillow block.

5. An oil level gauge as defined in claim 3, in which said body is of a one-piece construction of plastic material and contains threads adjacent the inner end for mounting said gauge on the pillow block.

6. An oil level gauge as defined in claim 1, in which said outer cylindrical portion and said disc-shaped end member are formed as a single piece with the outer annular peripheral corner thereof being arcuate in shape.

7. An oil level gauge as defined in claim 5, in which the outer surface of said body between said outer cylindrical portion and said threads contains a hexagonal portion for receiving a tool.

8. An oil level gauge as defined in claim 6, in which said annular member consists of an annular boss protruding outwardly from said disc-shaped member and a layer of opaque material on said annular boss.

9. An oil level gauge as defined in claim 8, in which said transparent material is plastic.

References Cited

UNITED STATES PATENTS

| | | | |
|---|---|---|---|
| 2,112,924 | 4/1938 | Molloy et al. | 116—114 |
| 2,331,917 | 10/1943 | Kocher | 73—334 |
| 2,413,252 | 12/1946 | Smith. | |
| 3,251,335 | 5/1966 | Dannevik | 116—117 |
| 3,277,713 | 10/1966 | Demyon | 73—334 |
| 3,345,870 | 10/1967 | Yoshinaga | 73—327 |

FOREIGN PATENTS

| | | |
|---|---|---|
| 275,467 | 6/1914 | Germany. |
| 514,133 | 10/1939 | Great Britain. |

S. CLEMENT SWISHER, Primary Examiner

D. M. YASICH, Assistant Examiner

U.S. Cl. X.R.

73—334